April 20, 1965     H. E. DAHLKE ETAL     3,178,940
ULTRASONIC MEASURING DEVICE
Filed Jan. 8, 1958     5 Sheets-Sheet 1
FIG. 1
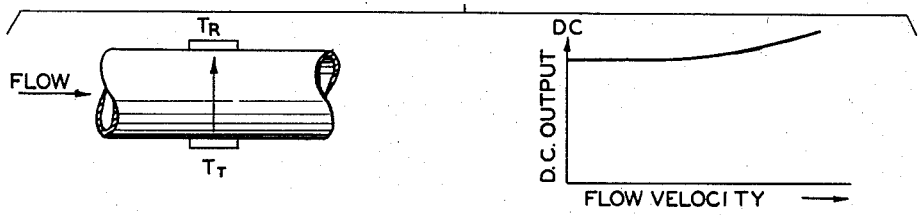
FIG. 2
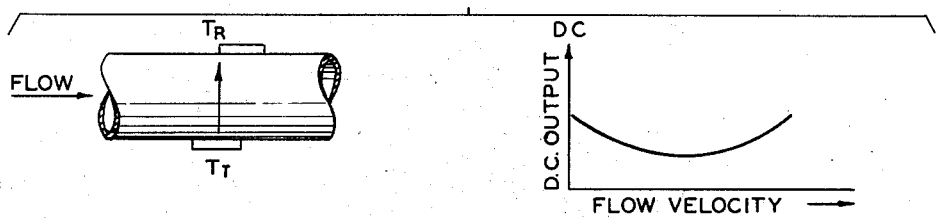
FIG. 3
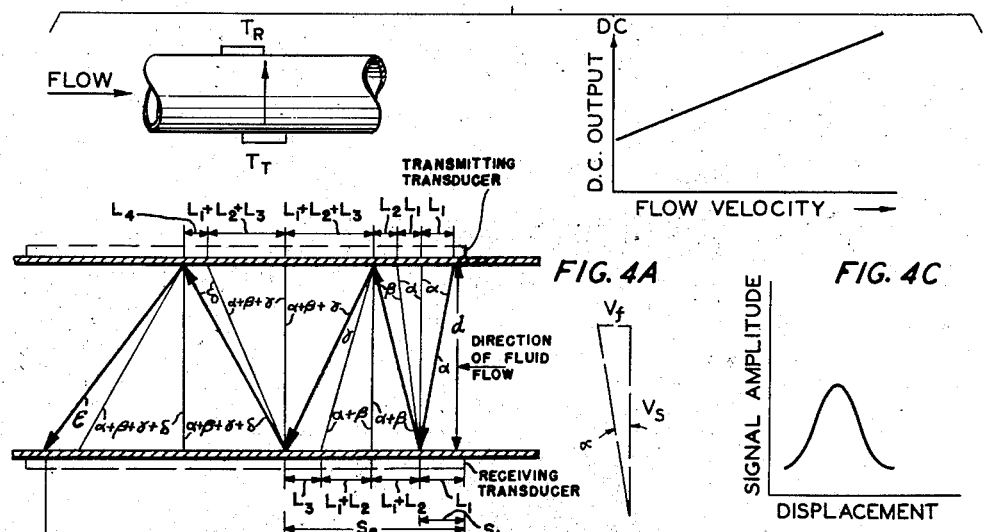
FIG. 4A  FIG. 4B  FIG. 4C
FIG. 5
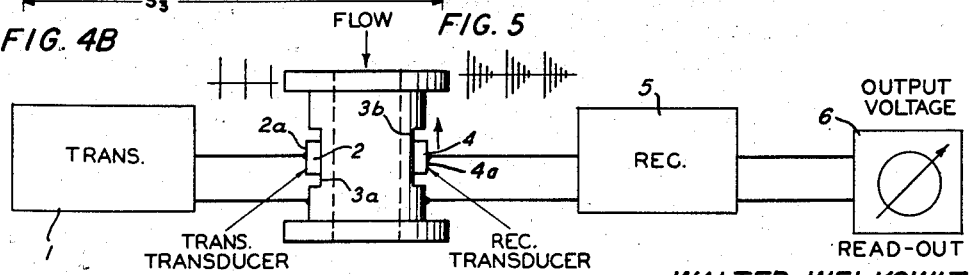
INVENTORS: WALTER WELKOWITZ
HUGO E. DAHLKE
BY Martha H. Pugh
AGENT April 20, 1965 H. E. DAHLKE ETAL 3,178,940
ULTRASONIC MEASURING DEVICE
Filed Jan. 8, 1958 5 Sheets-Sheet 2

INVENTORS: WALTER WELKOWITZ
HUGO E. DAHLKE
BY Martha H. Pugh
AGENT

April 20, 1965     H. E. DAHLKE ETAL     3,178,940
ULTRASONIC MEASURING DEVICE
Filed Jan. 8, 1958

INVENTORS: WALTER WELKOWITZ
HUGO E. DAHLKE

BY Martha H Pugh
AGENT

April 20, 1965  H. E. DAHLKE ETAL  3,178,940
ULTRASONIC MEASURING DEVICE
Filed Jan. 8, 1958  5 Sheets-Sheet 4

INVENTORS: *WALTER WELKOWITZ*
*HUGO E. DAHLKE*

BY *Martha H. Pugh*
AGENT

INVENTORS: WALTER WELKOWITZ
HUGO E. DAHLKE

BY Martha H Pugh
AGENT

United States Patent Office 3,178,940
Patented Apr. 20, 1965

3,178,940
ULTRASONIC MEASURING DEVICE

Hugo E. Dahlke, New Brunswick, and Walter Welkowitz, Edison Township, Middlesex County, N.J., assignors to Gulton Industries, Inc., Metuchen, N.J., a corporation of New Jersey
Filed Jan. 8, 1958, Ser. No. 707,744
10 Claims. (Cl. 73—194)

This invention relates in general to ultrasonic measuring techniques and apparatus, and more particularly, to flowmeters for measuring fluid-flow in closed conduits by ultrasonic means.

Many of the older techniques and devices for measuring fluid-flow through conduits rely on various types of mechanical and magnetic sensing systems which include deflecting vanes or other obstructions, interposed in the channel of flow. Devices of this type have the disadvantage that they cause a reduction in the maximum pressure of the flowing fluid thereby rendering the measurement of questionable accuracy because of the presence of the measuring device, and further interferring with the operation of the system for other purposes. Moreover, another apparent difficulty in such systems, is the necessity for having a break or discontinuity in the pipe walls where the testing device is inserted. These disadvantages are overcome by the use of ultrasonic flow measuring techniques and apparatus, wherein it is unnecessary to interpose any parts into the channel of flow.

However, problems also arise in ultrasonic flow measuring systems, particularly in certain types of pulse systems which utilize frequency, phase or time differences between transmitted and received pulses as the flow-measuring criteria. In many cases, these differences are, at best, small, and subject to wide variations with temperature and pressure which require compensation. Moreover, many types of ultrasonic flow measuring equipment utilize carrier frequency oscillators, which require careful frequency stabilization to provide meaurements of the required accuracy. A further requirement for many applications is that measurements be made in terms of mass flow rather than in terms of volume flow. In the ultrasonic flow-measuring devices available in the prior art, such compensations and modifications required complex and cumbersome circuitry.

It is accordingly, the object of the present invention to provide simplifications and improvements in ultrasonic measuring techniques and devices, thereby rendering the devices more accurate, more compact, and less costly. A more specific object is to provide a system which is readily adopted for mass flow measurements, and which is inherently temperature compensated.

These and other objects are realized, in accordance with the present invention, in a flow meter which relies for its operation on deflection of a pulsed ultrasonic beam which is transmitted transversely to the direction of fluid flow in a closed conduit. A simple pulse generator is coupled to induce resonant shock vibrations in an electroacoustic transducer disposed on a flat area on the outer-surface of a pipe section through which the fluid velocity is to be measured. A second transducer disposed on a parallel flat area on the outer surface on the opposite side of the pipe section receives the transmitted wave trains, which are amplified and detected. The signals are then passed through a direct-current amplifier to an indicating device. Assuming a constant transmitted pulse, the voltage across the indicating device varies as a function of the fluid-flow in the conduit, as a function of the position of the receiving transducer with respect to the transmitting transducer in the direction of flow and also as a function of the sizes and shapes of the two transducers. When the transmitting and receiving transducers are at exactly opposite points on the pipe section, the output voltage is nearly constant for small variations in flow. However, it has been discovered, in accordance with the present invention, that if the receiving transducer is displaced in the direction of the origin of the flow, with respect to the transmitting transducer, the direct current output voltage due to the received pulses is a linear function of the flow rate.

Moreover, it has been found that the slope of the calibration curve can be varied by increasing the gain of the direct current amplifier in the receiving circuit, so that, in addition to the principal transmitted pulse, the output includes a large number of reflected pulses, each of which contributes significantly. The shape and slope of the calibration curve is subject to further variation by modification of other parameters of the system, in a manner which will be discussed in detail hereinafter.

In accordance with a particular embodiment, the circuit of the present invention is so modified that the direct-current output voltage on the indicating meter is a linear function of the mass, rather than the volume, of fluid flowing in the system. This modification of the system permits flow measurements to be made on different fluids, without recalibration of the system. Moreover, as so modified, the system is inherently temperature compensated for temperature changes in the fluid, because of the fact that the tempeature-sensitive components are cancelled out, in a manner which will be described hereinafter.

Other features of the flow measuring technique of the present invention are that it does not involve a carrier-frequency oscillation generator, in which it is necessary to stabilize the frequency; and that, moreover, the slope and shape of the calibration curve may be modified as desired by merely changing the gain of the direct current amplifier, the position of the receiving transducer with respect to the transmitting transducer, the pulse repetition rate, the shape of the receiving transducer, or other circuit parameters.

Other objects, features and advantages of the present invention will be readily apparent from a study of the detailed specification hereinafter with reference to the attached drawing in which:

FIGURES 1, 2, and 3 are diagrammatic showing of the relationship between the transmitting and receiving transducer positions and the form of the calibration curve in terms of output voltage versus flow-rate;

FIGURE 4A is a vector plot of the sound velocity and the fluid velocity, showing the resultant velocity and the beam deflection angle;

FIGURE 4B is a diagrammatic view, partly in cross-section, showing the beam deflections in the conduit;

FIGURE 4C is a plot of signal amplitude against probe displacement, showing the peak in the amplitude at the center of the beam with no fluid flow;

FIGURE 5 is a block diagram of an illustrative circuit in accordance with the present invention;

Figure 8:
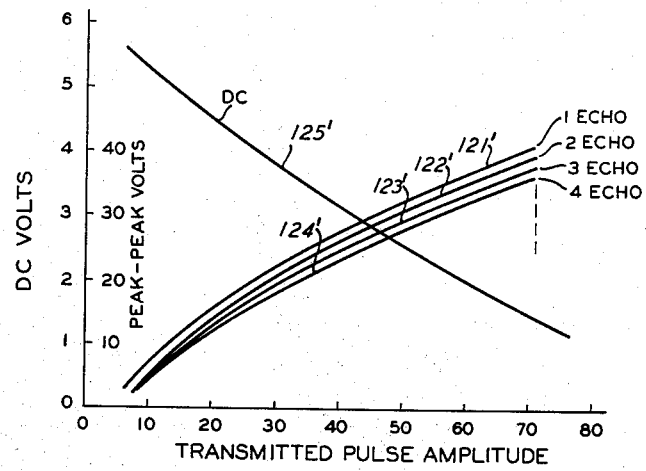
Figure 9:
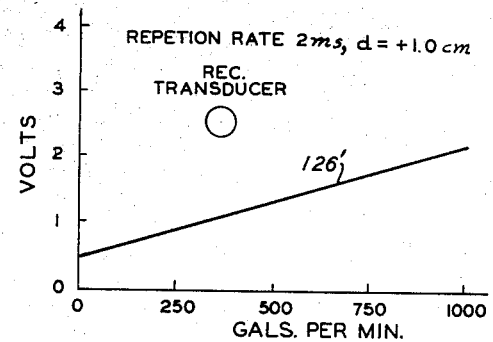
Figure 10:
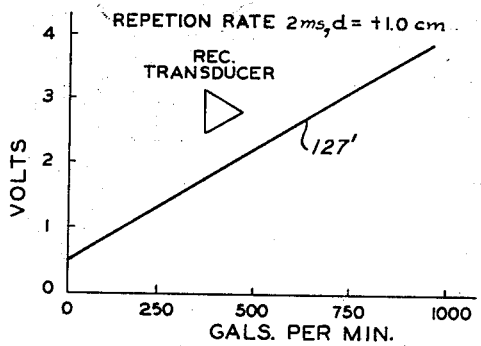

FIGURE 8 includes several curves showing the influence of the transmitted pulse amplitude on the peak-to-peak voltage of the echoes, measured on the plate of the third alternating-current amplifier stage and the voltage on the cathode of the direct-current amplifier tube;

FIGURES 9 and 10 are curves showing the variation in output voltage with fluid flow, utilizing receiving transducers of two different shapes.

The flow-measuring device of the present invention is designed to operate in accordance with the following principle. An ultrasonic transducer positioned on the outer surface of the pipe section through which the flow is to be measured is periodically shocked into resonant thickness-vibration, producing a series of ultrasonic pulses at its resonant frequency. If no fluid is flowing in the pipe section, and the beam pattern of the transmitting transducer is symmetrical about a plane perpendicular to the long axis of the pipe section, the maximum energy portion of the pulsed beam impinges on the far side of the pipe section at a point in the same plane. If fluid is flowing in the pipe, the transmitted pulse beam is deflected downstream from this position by an angle which is a function of the velocity of the fluid-flow in the pipe section and the kind of fluid, the flow of which is being measured.

A fraction of the transmitted pulse energy travels through the pipe wall to the receiving transducer which is mounted on the outside of the pipe, opposite to the transmitting transducer, and is picked up by a receiving transducer which is tuned to the same resonant frequency as the transmitting transducer.

The remaining part of the transmitted pulse energy is reflected from the pipe wall, and travels back and forth as a first echo, a portion again being reflected as a second echo, and so on, to create higher order echoes. After each reflection, the echo amplitude decreases, the pulse trains substantially disappearing after 20 to 30 reflections, depending on the absorption, refraction, etc. of the system. After the last echo disappears, another transmitter pulse is impressed on the system, and the cycle is repeated.

Hence, the voltage on the receiving transducer consists of a continual chain of pulses, each of which is followed by a number of echoes. These pulses and their echoes are amplified, and rectified, resulting in a negative voltage which is impressed on the grid of a direct-current amplifier.

The system is so calibrated, that under the condition of no-flow, sufficient negative bias is applied to hold the direct-current amplifier at the cut-off point. With increasing flow, the negative bias is reduced, since the number and the amplitude of echoes decreases causing current to flow in the cathode resistor of the direct-current amplifier, producing a cathode voltage which is read on the direct-current read-out meter.

It has been observed that increase or decrease in this voltage is a function of the position of the receiving transducer relative to the transmitting transducer in the direction of fluid flow in the pipe section.

Figure 7A:
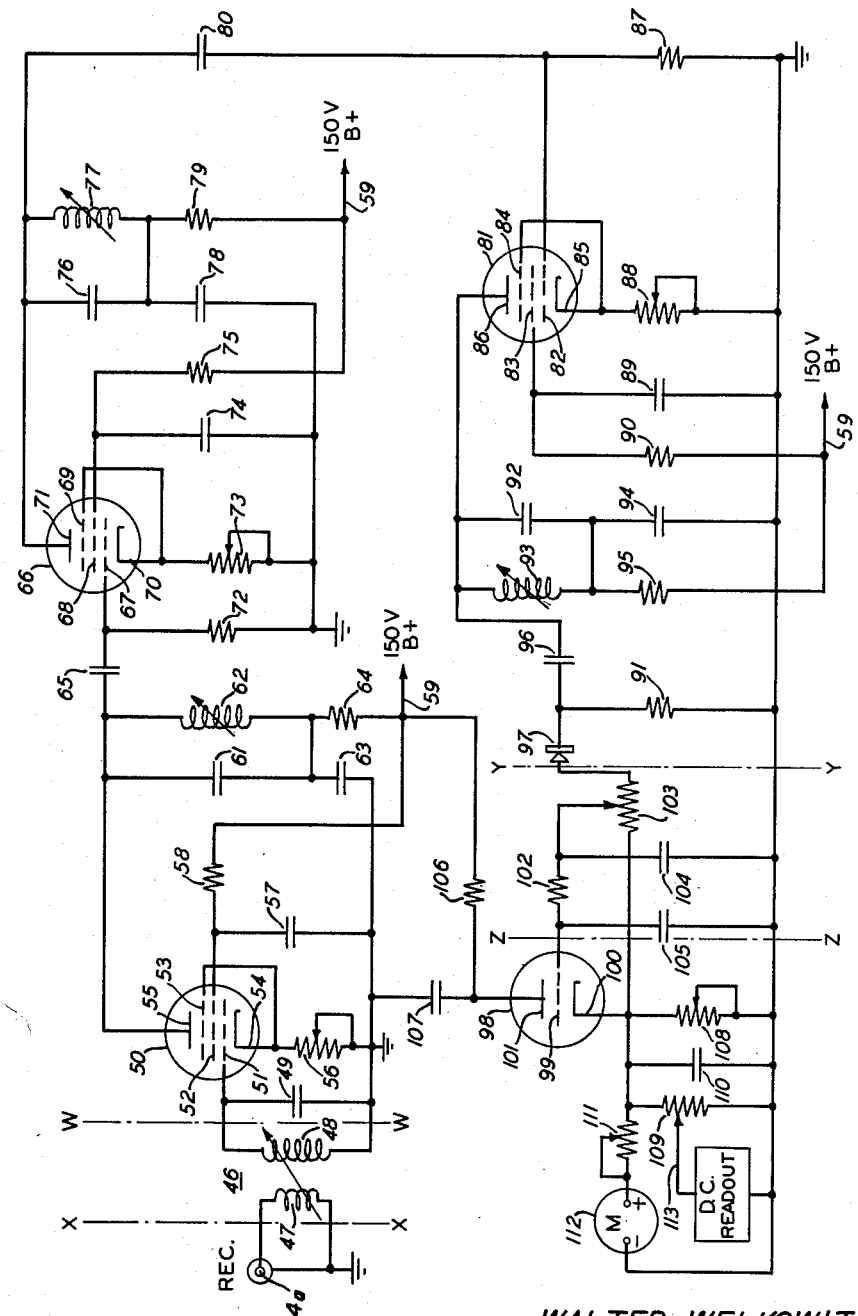
FIGURE 7A is a detailed circuit schematic of the receiving and indicating circuit in the illustrative example under description, designed for volume-flow calibration.
Figure 7B:
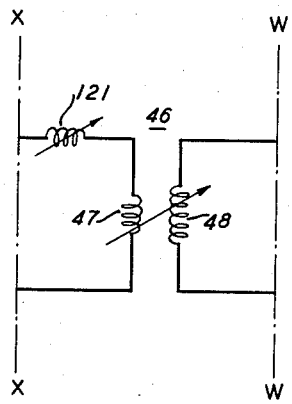
FIGURES 7B and 7C are modifications of the circuit shown in FIGURE 7A for mass-flow calibration.
Figure 7C:
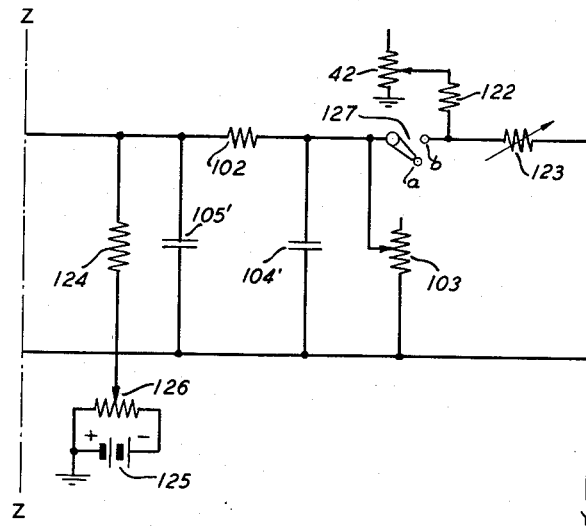

In the system shown in FIGURE 7A, the output voltage across the indicating meter varies in terms of volume flow in the conduit; whereas in a system modified in the manner indicated in FIGURES 7B and 7C, the voltage across the indicating meter varies in terms of mass flow.

Referring to FIGURE 1 of the drawings, $T_T$ represents the transmitting transducer, and $T_R$ represents the receiving transducer.

In the case illustrated in FIGURE 1, the receiving transducer is mounted directly opposite the transmitting transducer, the line of normal incidence passing through the center of both transducers. When the output voltage of the direct-current amplifier is plotted against flow, for this configuration, it is seen that the curve remains relatively flat for a considerable range of flow velocities.

In the case illustrated in FIGURE 2, the center of the receiving transducer is displaced in the direction of flow, a distance of, for example, about ½ inch for a pipe with 3 inch inside diameter with respect to the transmitting transducer. The output voltage, when plotted against the flow-velocity, decreases to a minimum and then increases.

In the case shown in FIGURE 3, the receiving transducer is displaced upstream with respect to the transmitting transducer, a distance of, for example, about ½ inch for a pipe with three inch inside diameter. In the latter case, the output voltage varies linearly with changes in flow velocity. It is apparent that to enable the receiving transducer to receive the transmitted beam directly and a large number of echoes thereof that the receiving transducer is spaced only slightly upstream from the transmitting transducer where it is well within the direct beam of the transmitted wave.

If the ultrasonic beam is initially directed perpendicular to the pipe axis, under a condition of no-flow, the maximum energy reflection points from the opposite side of the pipe may easily be determined, as a function of the fluid velocity from the following considerations.

Let:
$V_s$ = sound velocity in the fluid
$V_f$ = fluid velocity
$\alpha$ = angle of deflection
$d$ = inside diameter of the pipe
$L_1$ = distance of the first reflection point of the beam under a condition of flow, from the reflecting point at no-flow.
$L_n$ is the distance corresponding to the $n$th reflecting point; and
$n$ is any odd integer.

From FIGURE 4A, it will be apparent that when fluid is flowing in the pipe, an impressed ultrasonic pulse will travel at a velocity which is the vector resultant of $V_f$ and $V_s$.

Referring to FIGURE 4B:

$$\tan \alpha = \frac{V_f}{V_s} \quad (1)$$

$$\tan \alpha = \frac{L_1}{d} \quad (2)$$

$$\frac{V_f}{V_s} = \frac{L_1}{d} \quad (3)$$

$$L_1 = \frac{dV_f}{V_s} \quad (4)$$

In FIGURE 4B: the angle $\beta$ is the additional amount of beam deflection after the first reflection; the angle $\gamma$ is the additional amount of beam deflection after the second reflection; the angle $\delta$ is the additional amount of beam deflection after the third reflection; and the angle $\epsilon$ is the additional amount of beam deflection after the fourth reflection.

From FIGURE 4B, since the angles of incidence and reflection are equal at each contact of the beam with the pipe wall and since the beam is displaced by an additional amount after each reflection, we get:

$$\tan (\alpha + \beta) = \frac{L_1 + L_2}{d} \quad (5)$$

$$\tan (\alpha + \beta) = \frac{V_f + V_f}{V_s} \quad (6)$$

$$\tan (\alpha + \beta) = \frac{\tan \alpha + \tan \beta}{1 - \tan \alpha \tan \beta} \quad (7)$$

from (1) and (7), we get:

$$\frac{2V_f}{V_s} = \frac{\frac{V_f}{V_s} + \tan \beta}{1 - \frac{V_f}{V_s} \tan \beta} \quad (8)$$

and $$\tan \beta = \frac{V_f}{V_s}\left(\frac{1}{1+\frac{2V_f^2}{V_s^2}}\right) \quad (9)$$

since $$V_f \ll V_s, \tan \beta = \frac{V_f}{V_s} = \tan \alpha \quad (10)$$

and $$\alpha = \beta; L_1 = L_2 \quad (11)$$

In similar manner, it can be shown that each subsequently added angle is likewise equal to $\alpha$.

Referring to FIGURE 4B, it can be seen that the angle the beam makes with the wall of the pipe on the side from which the first transmission across the pipe is taken is given as follows:

Angle of initial crossing is $\alpha$.
Angle of second crossing is $2\alpha$.
Angle of third crossing is $3\alpha$.
Angle of $n$th crossing is $n\alpha$.

The beam shift from the point of beam origination after each crossing is given as follows:

After the initial crossing, it is $L_1$.
After the second crossing, it is $3L_1 = L_2 + 2L_1$.
After the third crossing, it is $6L_1 = L_3 + 2L_2 + 3L_1$.
After the fourth crossing, it is $10L_1 = L_4 + 2L_3 + 3L_2 + 4L_1$.
After the $n$th crossing, it is $$\frac{n}{2}(n+1)L_1 \quad (12)$$

Since the receiving transducer is oppositely placed on the pipe from the transmitting transducer, signals may be received only on odd numbered crossings. The signals so received may be defined as echoes as follows:

The second echo is the pickup after the third crossing.
The third echo is the pickup after the fifth crossing.
The $n$th echo is the pickup after the $(2n-1)$ crossing. (13)

We define the beam shift of each echo with the letter S and the subscript number of the echo and combining (12) and (13) we get:

The shift of the first echo $= S_1 = L_1$.
The shift of the second echo $= S_2 = 6L_1$.
The shift of the third echo $= S_3 = 15L_1$.
The shift of the $n$th echo $= S_n = n(2n-1)L_1$.

The pulses picked up by the receiving transducer, after passing through several stages of alternating current amplification, are rectified and impressed on the grid of the direct current amplifier as a bias. Decrease in this bias, as it occurs with increasing flow permits the direct-current amplifier to conduct, so that the voltage across its cathode resistor increases with increasing fluid-flow. The direct-current output characteristic has been found to be a function of the shape, size, and position of the transducer, and also, of the adjustment of the transmitter and receiver, as well as of the relative positions of the transmitter and receiver.

As previously pointed out, an important feature of the system of the present invention is that the circuit can be modified so that the output voltage varies as a linear function of mass flow, rather than volume flow, thereby providing a uniform calibration for all liquids in terms of pounds per minute. This modification has the advantage that it eliminates the necessity for temperature compensation in the fluid conduit.

Such a modification is based on the following theoretical considerations:

Let $a$ equal the amplitude of a received signal.

Then, referring to FIGURE 4C, which shows diagrammatically the variation of signal amplitude with beam displacement:

$$a = r_1 - r_2 L_1 \quad (14)$$

(This assumes that operation takes place over a small range of amplitudes and displacements.)

In Equation 14 $r_1$ and $r_2$ are constants, and $L_1$ is the distance of the first reflection point of the beam, when the fluid is flowing.

Substituting from Equation 4:

$$a = r_1 - r_2 \frac{(dV_f)}{(V_s)} \quad (15)$$

If the receiving circuit is modified so that the static capacitance of the receiving transducer is balanced out, then the following condition obtains:

$$e_0 = \rho V_s a \quad (16)$$

where $e_0$ equals the output voltage on the receiving transducer in a liquid of density $\rho$ and sound velocity $V_s$.

Substituting from Equation 15:

$$e_0 = \rho V_s r_1 - \rho V_s r_2 d \frac{V_f}{V_s} \quad (17)$$

From the above, it is seen that the $V_s$ term balances out in the second term; hence, this term is independent of sound velocity in the fluid. Accordingly, in order to make the output voltage independent of sound velocity, and a function of mass flow, rather than of volume flow, it is necessary to add to the output voltage a term which is equal to, but opposite in sign, to the first term of Equation 17. Such a voltage, proportional to $\rho V_s$, is derived at the input to the transmitting transducer, since the static capacitance of the latter has been balanced out to provide a resistive load. This is fed directly into the direct current output, of the receiver adjustment being made under a condition of no fluid flow in the conduit to give a zero reading at the output meter. Accordingly, under a condition of fluid flow, the output meter reads the following voltage:

$$e_0 1 = r_3 d \rho V f \quad (18)$$

where $r_3$ is a constant.

STRUCTURE

FIGURE 5 shows, in block diagram, the circuit arrangement for a preferred embodiment of the flow-meter of the present invention. This includes the transmitting circuit 1, the transducers 2 and 4 mounted on pipe 3, and the receiving circuit 5.

The transmitter 1 is connected across the electrodes 2a, of the transmitting transducer which are evaporated and fired on or otherwise attached, to the opposite major surfaces of a piezoelectric transducer 2. The transmitting transducer 2 and the receiving transducer 4 on the opposite side of the pipe, may comprise any of the types piezoelectric crystalline elements well known in the art, constructed to vibrate in a thickness mode, such as, for example X-cut quartz, or thin sheet barium titanate ceramic, processed and polarized in the manner set forth in detail in Patent 2,486,410 issued to Glenn N. Howatt dated November 1, 1949. In accordance with one form the transducers are flat wafers about 100 mils thick, and ⅜ inch in diameter, vibrating in a resonant thickness mode of about one megacycle. These are coupled to a flat portions 3a and 3b of a pipe section 3. In the example under description the latter is about six inches long, and has an inner diameter of 3 inches, and outer diameter of four inches. The coupling to flats 3a and 3b may be made by means of any satisfactory medium of matching acoustic impedance, such as an epoxy system in which the base resin is combined with a hardener, such as, for example, metaphenylene diamine, and inert mineral fillers. Portions 3a and 3b are machined flat and parallel to within about a mil. The wall thickness is .206 inch, and is uniform over the extent of the portion to which the transducers are attached. This thickness is a half wave length in the one megacycle frequency of the transducers within a tolerance of about one mil. Pipe section 3 terminates in a pair of flanges designed to fasten the unit into the fluid pipe system.

Whereas in the embodiments under description, the transmitting and receiving transducers are both round, flat wafers, in alternative embodiments they may be cut in other shapes, each of which produces a different characteristic curve relating output voltage to the rate of fluid flow in the conduit. A practical shape for the receiving transducers has been found to be a flat, triangular wafer, two sides of which are ⅜ inch, and one side, ½ inch. This is mounted with the ½ inch side parallel to the direction of flow in the conduit.

In the present illustration, the transducer 4 on the opposite side of the pipe is displaced about 1 centimeter with respect to the transducer 3 in a direction opposite to the direction of flow.

The signals received by the transducer 4 are conducted by a coaxial cable to the receiving circuit 5 where they are amplified and rectified, the rectified output passing to a meter 6.

In accordance with a further feature of the invention, the gain of the direct-current amplifier of the receiving circuit 5 can be adjusted so that any given flow rate, over the range, for example 100 to 1000 gallons per minute, can produce any desired output voltage, made up not only of the primary received signal, but up to as many as 15 or 20 echoes of the received signal. This provides a direct-current output which varies with changes in fluid-flow, in accordance with a linear characteristic, the slope of which may be modified by including a large number of echoes in the direct-current output. The circuit configuration will now be described in detail.

*Transmitter circuit*

Figure 6A:
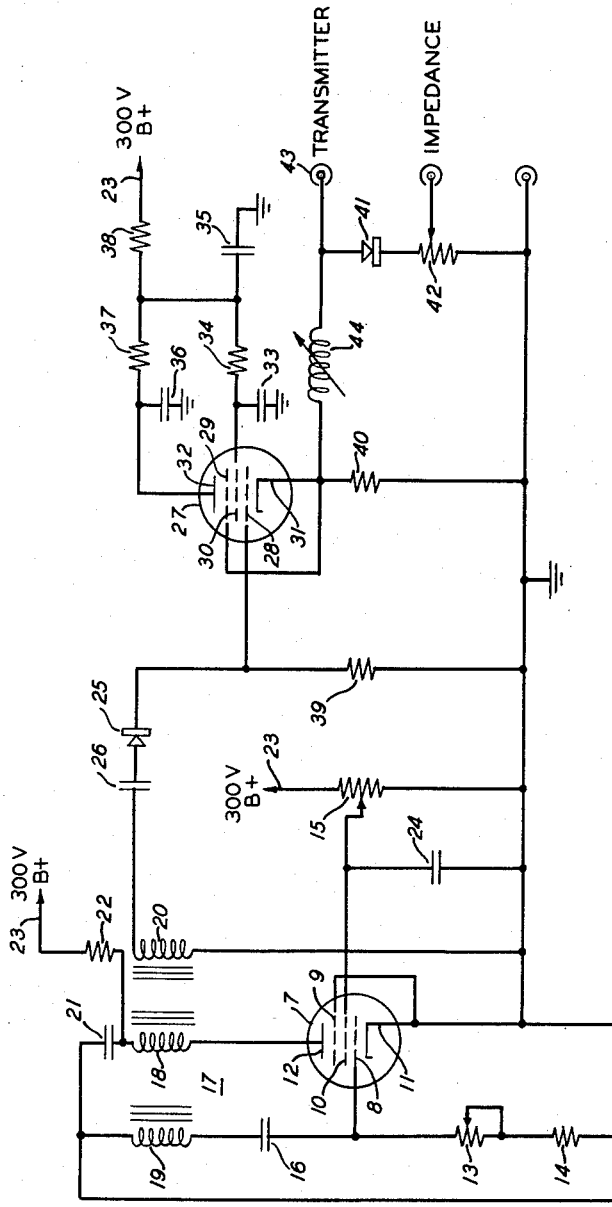
FIGURE 6A is a detailed circuit schematic of the blocking oscillator pulse transmitter of the illustrative example under description.
Figure 6C:
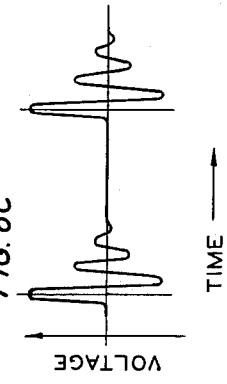
FIGURE 6C shows the form of the voltage impressed across the transmitting transducer.

Considering the transmitter circuit of FIGURE 6A, the first stage is a free-running blocking oscillator. This includes a pentode 7, having a control grid 8, a screen grid 10, and a suppressor grid 9 connected to a cathode 11, and a plate 12. The screen 10 is energized from the 300 volt positive source 23 through a slider connected across the 250,000 ohm potential divider 15, an alternating current path to ground being provided by the 0.05 micro-farad capacitor 24. The plate 12 is coupled to both the control grid 8 and the cathode 11 through the primary coil 18 of a pulse transformer 17, having a one-to-one turns ratio to a pair of secondary coils, 19 and 20. The transformer 17, which has a reactance within the microhenry range, is characterized by a very fast rise time, for example, about 0.2 microsecond, and is constructed to withstand peak-to-peak voltages within the range 200 to 400 volts. One terminal of coil 19 is connected in series with the .004 microfarad capacitor 16 to control grid 8, whereas the other terminal is connected directly to cathode 11. A 0.05 microfarad capacitor 21 connects the other terminal of the coil 19 to the junction of plate coil 18, which is connected to the positive 300 volt-current source 23 through the 2,700 ohm resistor 22, for energizing the plate 12.

Control grid 8 is connected to cathode 11 through a 2.5 megohm variable resistor 13 in series with the 0.63 megohm resistor 14.

One terminal of the coil 20 is connected directly to the cathode 11, while the other terminal thereof is connected through the 0.01 micro-farad capacitor 26 in the direction of easy flow to the positive terminal of the rectifier 25, which may comprise any tube diode or selenium rectifier having a good front-to-back ratio and which is adapted to withstand up to about 100 volts maximum positive or negative. The reverse terminal of rectifier 25 is connected to the control grid 28 of pentode 27, of the cathode-follower amplifier stage, across a 100,000 ohm grid resistor 39.

In addition to the control grid 28, the pentode 27 includes suppressor grid 29 directly connected to the cathode 31, a screen grid 30, and a plate 32. The plate 32 is energized through a 2,700 ohm resistor 37 and an 11,000 ohm resistor 38 by the 300 volt positive potential source 23; and the screen grid 30 is energized through the 10,000 ohm resistor 34, also connected to the 11,000 ohm resistor 38, and the positive source 23. An alternating current path directly to ground from the plate 32 is provided through the .05 microfarad condenser 36; and from the screen 30 through the 0.05 microfarad capacitor 33. In addition, the junction between the resistors 34, 37, and 38 is connected to ground through the 0.03 microfarad capacitor 35.

The cathode 31 is connected to ground through the 100 ohm resistance 40; cathode 31 is also connected in the direction of easy current flow to the rectifier 41 through the inductance 44 variable over the microhenry range. The other terminal of rectifier 41 is connected through the one megohm resistor 42 to ground. The junction between inductance 44 and one terminal of rectifier 41 is connected through the central conductor of a coaxial cable coupling to one electrode 2a of the transducer 2 mounted on the flate portion 3a on one side of the pipe section 3.

The pipe section, in contact with the second electrode of the transducer 2, is connected to the grounded outer conductor of the cable 43.

The transducer 4 is displaced one centimeter upstream in the direction of flow in the pipe 3. As previously explained, the direct-current output voltage is a function of the position of the receiving transducer 4 with respect to the transmitting transducer 3 in the direction of fluid-flow, the shape of the output voltage curve versus fluid-flow being subject to the relative positions of the transmitting and receiving transducers, as indicated in FIGURES 1, 2 and 3.

*Receiver*

Referring to FIGURE 7A the receiving circuit comprises three radio frequency amplifier stages, a rectifier, a direct current amplifier, and a direct-current meter.

The electrodes 4a of the transducer 4 are connected by means of a coaxial coupling cable across the primary winding 47 of the transformer 46, which is coupled to the input of the first stage of amplification. Primary winding 47 comprises 15 turns of the number 36 enamel wire, the lower terminal being grounded. The secondary coil 48 of the transformer 46, which comprises 100 turns of number 36 enamel wire, is connected in parallel with the 100 microfarad capacitor 49, to provide a tuned circuit across the control grid 51 of the pentode 50. In addition to the control grid 51, the pentode tube 50 comprises a suppressor grid 53, directly connected to the cathode 54, a screen grid 52, and a plate 55. The plate is energized from the 150 volt positive potential source 59 through a 4,700 ohm resistor 64 in series with a tuned circuit which comprises the inductance 62, variable over the range 250 to 350 microhenries, parallel with the 100 micro-microfarad capacitor 61. The screen 52 is energized from source 59 through the 22,000 ohm resistor 58; and screen 52 is connected to ground through the .05 microfarad capacitor 57. The cathode 54 is connected to the low-potential-terminal of the coil 48 through 1,000 ohm variable resistor 56, and also to the low potential terminal of the tuned circuit comprising coil 62 and capacitor 61, through the 0.05 microfarad condensor 63.

The plate output circuit of the pentode 50 connects to a second stage of radio frequency amplification, which includes the pentode 66, through a 0.01 microfarad coupling capacitor 65, which is connected to the control grid 67 across the 47,000 ohm grid-leak resistance 72 to ground. The tube 66 also includes suppressor grid 69, directly connected to the cathode 70, screen grid 68, and plate 71.

The plate 71 is energized from the positive potential 150 volt source 59, through the 47,000 ohm resistor 79 in series with a tuned circuit including the 100 micro-microfarad capacitor 76 and the inductor 77 variable over the 250 to 350 microhenry range. The screen 68 is energized from the same 150 volt potential source 59 through a 22,000 ohm resistor 75; and is connected to ground through the .05 microfarad capacitor 74. The cathode 70 is connected to ground through the 1,000 ohm variable resistor 73.

The output circuit from plate 71 in the second stage of amplification is coupled through the 0.01 microfarad capacitor 80 to the control grid 82 of the pentode 81 in the third stage of radio frequency amplification, across the 47,000 ohm grid leak resistor 87 to ground. The pentode 81 comprises, in addition the suppressor grid 84 directly coupled to cathode 85, the screen grid 83, and the plate 86. The latter is energized from positive 150 volt source 59 through the 47,000 ohm resistor 95 in series with a tuned circuit, including the 100 micro-microfarad capacitor 92 in parallel with the variable inductor 93, the latter being connected to ground through the .05 microfarad capacitor 94. The screen 83 is energized by the same 150 volt source 59 through the 22,000 ohm resistor 90, a connection from the screen 83 to ground being provided through the .05 microfarad capacitor 89.

The output circuit from plate 86 is connected in the direction of high resistance to rectifier 97 through the .05 microfarad coupling capacitor 96, across the 470,000 ohm resistor 91.

If, as shown in FIGURE 7A, the device is to read in terms of volume flow, velocity then the arrangement is as follows.

The output from rectifier 97 passes thru a potential divider consisting of the 1 megohm resistor 103, which is connected in series to the cathode 100 of triode 98. A slider connects a portion of resistor 103 in series with the ten thousand ohm resistor 102 to the control grid 99 of tube 98. The .05 microfarad capacitor 104 connects the slider to ground; and the .5 microfarad capacitor 105 connects grid 99 to ground.

In addition to cathode 100 and grid 99, the triode 98, the direct-current amplifier stage includes the plate 101, which is energized by the positive 150 volt source 59 through the 10,000 ohm resistor 106. The plate 101 is coupled through the .05 microfarad capacitor 107 to ground. The cathode 100 is connected to ground through the 25,000 ohm variable resistor 108, which is in parallel with the .05 microfarad capacitor 110, and the one megohm potential divider 109. A slider 113 is connected across the latter for the purpose of adjusting the direct-current read-out. The entire output across potential divider 109 is impressed across the 100,000 ohm variable resistor 111 in series with a conventional direct-current meter 112, the negative terminal of which is grounded. As previously stated, for the embodiment just described, the direct-current meter 112 is calibrated in terms of volume flow velocity.

If it is desired to measure mass-flow, velocity instead of volume flow, velocity and to have a system in which it is possible to measure the flow-velocity of different types of liquids, without recalibration, then it is necessary to modify the system of FIGURE 7A in the manner indicated by FIGURES 7B and 7C of the drawings.

In FIGURE 7B, the variable inductor 121 has been interposed in the section to the left of the dotted line WW and to the right of line XX, in FIGURE 7A, between the connection to receiving transducer 4 and the high potential terminal of the primary coil 47 of transformer 46. The purpose of this addition is to balance out the static capacitance of receiving transducer 4.

Referring to FIGURE 7C, the input circuit to the direct-current amplifier in the circuit of FIGURE 7A has been modified between the dotted lines YY and ZZ by adding a feed-in circuit to impress on the receiver output circuit a component of voltage derived from the transmitter, for the purpose of the balancing out the $\rho V_S$ term from the receiver output, voltage in the manner set forth in detail hereinbefore with reference to Equations 17 and 18.

This circuit includes a slider connected to potential divider 42, in the transmitter circuit FIGURE 6A through the half megohm resistor 122 to the junction between the half-megohm variable resistor 123, and the terminal $b$ of single-throw switch 127. The common terminal of the latter is connected to the junction of the half-megohm fixed resistor 102, and the one-megohm variable resistor 103. The terminal $a$ of switch 127 opens the circuit, both from the rectifier 97 and from the feed-in circuit from the potentiometer 42 in the transmitter circuit. The parallel connected capacitors 104' and 105' have the values .01 and .5 microfarads, respectively;

The grid 99 is biased negatively through the one megohm resistor 124 connected to the 110,000 ohm potential divider 126, across the 108 volt negative terminal of potential source 125.

OPERATION

In the transmitting circuit, when the energy from the positive source 23 is applied to the plate 12 of the blocking-oscillator pentode 7, the latter, at first becomes conducting, producing a positive surge of output current. This charges up the condenser 16 in a direction to drive the control grid 8 below cut-off, whereupon pentode 7 ceases to conduct. The negative charge gradually leaks off the grid 8 thru the grid resistor 13, until the grid again is raised about cut-off and the cycle repeated.

Figure 6B:
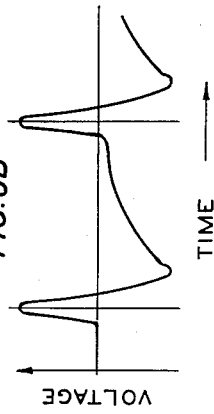
FIGURE 6B shows the general form of the plate voltage in the blocking oscillator of FIGURE 6A.

The voltage variations with time, of plate 12, are indicated in FIGURE 6B of the drawings. The negative portion of the characteristic is cut off by the diode 25, so that only the positive pulses are impressed on the grid 18 of the pentode 27.

The repetition-pulse rate of the blocking oscillator, which can be adjusted by means of the grid resistor 13, is about 2 milliseconds in the present illustrative embodiment. The pulse-width, of the positive pulse which in the present embodiment is about one microsecond, is a function of the time constant of the transformer 17, which is about 0.2 microsecond.

Power-output pentode 27, which is connected as a cathode follower, functions first, to decouple the output of the transmitting transducer 2 from the blocking oscillator; and secondly to amplify and broaden the positive output pulse which is impressed across the transducer 2.

When the positive output pulse from the blocking oscillator, is impressed on the grid 28, it drives the pentode 27 into conduction. The resulting positive pulse derived from the cathode resistor 40 is impressed across the transmitting transducer 2, thru coaxial cable 43, shocking the transducer into resonant vibration at about 1 megacycle, so that it transmits an ultrasonic pulse about 10 microseconds long across the stream of liquid flowing in the pipe section 3.

The reactance of coil 44 is adjusted to tune out the blocked capacitance of transmitting transducer 2, thereby presenting a resistive load thereacross, which is useful in case of a mass-flow calibration, as previously described.

The transmitted pulse from transducer 2, together with from twenty-to-thirty echoes, is received by the receiving transducer 4, and impressed through the coaxial cable on to the primary coil 47 of the impedance-matching tuned transformer 46, the secondary coil 48 of which goes to the grid of tube 50 in the first alternating-current amplifier stage.

All three alternating current amplifier stages, including tubes 50, 66 and 81, include plate circuits which are tuned to the one megacycle resonant frequency of the transducers 2 and 4. The second and third stages, including tubes 66 and 81, can be overdriven for approximately the first 10 echoes of the received pulses. The gain in each of the stages is controlled by variation of the respective cathode resistors, 56, 73, and 88.

The diode 97, with its filter network including capacitors 104 and 105, and resistors 103 and 102, serves to provide a negative, direct-current voltage which is a function of the number, amplitude, and width of the echoes, and the repetition rate of the transmitted pulses. The function of the filtering circuit is to eliminate transient fluctuations due to turbulence in the pipe. The amplitude of the direct-current output voltage is adjusted by varying the load resistance 103 to bias the grid 99 of triode 98 at cut-off which in the present example may be some preselected small current such as 10 microamperes under a condition of no liquid flow in the conduit. With increasing flow, the number and amplitude of echoes received by the transducer 4 decreases, resulting in a decreasing negative grid-voltage. This causes triode 98 to conduct, and produces a voltage across the cathode resistor 108 which increases with increasing flow. This output voltage is impressed on the meter 112, which may be calibrated in terms of volume flow velocity (gallons-per-minute) for the circuit as shown in FIGURE 7A, or in terms of mass-flow velocity (6 pounds per minute) for the circuit modified in the manner shown in FIGURES 7B and 7C.

In the latter case, with switch 127 open, in $a$ position, and under a condition of no-flow in the conduit, the slider on potentiometer 126 is adjusted to bring the voltage on grid 99 to cut-off (that is, at a current of, for example, 10 microamperes) for tube 98. Then, with switch 127 in $b$ position, and a condition of no-flow in the conduit, the slider on potentiometer 42 is adjusted to bring the voltage on tube 98 again to cut-off, as above. As previously explained, this cancels out the $\rho V_s$ factor from the output voltage, as indicated by Equations 10 and 11, so that under a condition of fluid flow, in the conduit, and with switch 127 closed in position $b$, the output meter 112 now reads in terms of mass-flow velocity (pounds per minute).

The following precautions should be observed in installing the flow-meter pipe in a system in which the flow is to be measured.

(1) The flowmeter pipe should preferably be installed in a straight section of pipe so that its distance from an elbow is at least 6 feet. Any decrease in this distance may result in inaccurate readings due to turbulence in the pipe.

(2) The inside diameter of the flowmeter pipe should be aligned with the inside diameter of the feed pipe to avoid turbulence.

(3) The flowmeter pipe 3 should be mounted so that the center line between the transmitter and receiver transducers is approximately horizontal to avoid gas bubbles from assembling on the inside flats of the flow-meter pipe 3.

Referring to FIGURE 8 of the drawings, there are shown four curves, 121′ thru 124′, which respectively represent the peak-to-peak plate voltages on tube 81 due to the 1st, 2nd, 3rd, and 4th echoes of the transmitted ultrasonic pulse, which vary as a function of the amplitude of the transmitted pulse, the latter having been changed by varying voltage on the screen of tube 7 in the blocking oscillator in the transmitting circuit. Additional echoes, up to twenty or thirty, produce increasingly linear characteristics on the plate of tube 81.

Curve 125′ shows the direct-current output voltage taken across the cathode resistor 108, due to a composite including up to twenty or thirty echoes.

Curves 126′ and 127′ in FIGURES 9 and 10 respectively show variations in output voltage from rectifier 97, utilizing in the former case, a receiving transducer which is a thin wafer about 100 mils thick, the major surface of which is circular, having a diameter of ⅜ inch; and in the latter case, a transducer of the same thickness which is triangular, two sides being ⅜ inch, and one side ½ inch. In the preferred example under discussion, the triangular transducer is mounted so as to have the larger edge of the triangle perpendicular to and symmetrical with respect to the direction of fluid flow in the conduit.

In each of the cases illustrated in FIGURES 9 and 10, the pulse-repetition rates were 2 milliseconds, and the transducers were disposed with their centers displaced about 1 centimeter in the direction of flow with respect to the transmitting transducers, which were circular wafers.

It is accordingly apparent that transducers of other shapes than those specifically shown can function successfully for the purposes of the present invention. For example, pear shaped transducers have also been used with some success, for this purpose.

While specific structures have been disclosed to illustrate the principles of the present invention, it will be apparent to those skilled in the art that the scope of the present invention is not to be construed as limited to any particular structure or circuit configuration shown herein by way of example.

What we claim is:

1. A system for measuring fluid flow in a conduit, said system including a vibration transmitting and a vibration receiving transducer coupled to said conduit, said transmitting transducer being oriented to direct a vibration beam substantially transversely across the conduit in the absence of fluid flow, means for energizing said transmitting transducer intermittently to generate a pulsed vibration wave beam, means coupled to said receiving transducer and responsive to the amplitude of the received wave, said receiving transducer being displaced a short distance from said transmitting transducer along the principal axis of said conduit in the direction of the origin of the flow of the fluid through the conduit where it intercepts the vibration wave pulsations directed transversely of the conduit and echo pulsations thereof, the amount of vibration energy received by the receiving transducer varying substantially with the change in the flow of the fluid as the vibration wave beam is deflected by the movement thereof, and a fluid flow indicating means coupled to said receiving transducer and responsive to the output of said receiving transducer for indicating fluid flow.

2. The measuring system of claim 1 wherein said receiving transducer is positioned on the opposite side of said conduit from said transmitting transducer so as to receive the vibration wave beam directly from said transmitting transducer before the same has been reflected by the conduit walls.

3. The measuring system of claim 1 wherein said receiving transducer intercepts and is responsive to at least one echo of each transmitted wave pulsation received after the directly received wave pulsation.

4. The measuring system of claim 1 wherein the spacing between successively generated wave pulsations is such that the receiving transducer receives at least one echo pulsation reflected from the conduit walls in addition to the first received pulsation before receiving the pulsation from the next transmitted wave.

5. A system for measuring fluid flow in a conduit comprising: vibration transmitting and receiving transducers coupled to said conduit, said receiving transducer being positioned with respect to said transmitting transducer to provide an output which is a measure of the fluid flow rate, an energizing circuit for said transmitting transducer including a pulse generating circuit for providing pulses at a fixed pulse repetition rate, means responsive to the pulse output of said pulse generating means for intermittently energizing said transmitting transducer at the fixed pulse repetition rate of said pulse generating circuit, said transmitting transducer being oriented to direct a vibration wave beam substantially transversely to the principal axis of the conduit in the absence of fluid flow, said receiving transducer being spaced from said transmitting transducer a distance measured along the principal axis of the conduit which is within the beam of the transmitted wave, wherein it receives a relatively large number of vibration wave pulsations reflected from the wall of the conduit for each vibration wave pulsation transmitted by said transmitting transducer, said received pulsations having a magnitude which varies with the rate of fluid flow, and a fluid flow indicating means coupled to said receiving transducer and responsive to the output of said receiving transducer for indicating fluid flow.

6. The measuring system of claim 5 wherein the spacing between successive pulsations generated by said pulse generating means and the resulting vibration wave pulsations of said transmitting transducer being such that the receiving transducer receives at least one echo pulsation reflected from the conduit walls in addition to the first received pulsation before receiving the pulsation from the next transmitted wave.

7. The measuring system of claim 5 including detecting means coupled to said receiving transducer and comprising rectifying and averaging means for producing a direct current output which is a function of the average amplitude of the received signals.

8. A system for measuring fluid flow in a conduit, said system including a vibration transmitting and a vibration receiving transducer coupled to said conduit, said transmitting transducer being oriented to direct a vibration beam substantially transversely across the conduit in the absence of fluid flow, means for intermittently energizing said transmitting transducer to generate spaced vibration wave beam pulsations, flow indicating means coupled to said receiving transducer and responsive to the amplitude of the received wave, said receiving transducer being displaced slightly from said transmitting transducer along the principal axis of said conduit where the vibration energy received by the receiving transducer varies substantially with the change in the flow of the fluid and multiple reflections of the transmitted pulsations are intercepted thereby.

9. The measuring system of claim 8 wherein said receiving transducer is positioned on the opposite side of said conduit from said transmitting transducer so as to receive the vibration wave beam directly from said transmitting transducer before the same has been reflected by the conduit walls.

10. The measuring system of claim 8 wherein the spacing between successively generated wave pulsations is such that the amplitude of the received echoes of a transmitted pulsation received by the receiving transducer becomes insignificant before it receives the first vibration energy of the next transmitted pulsation.

References Cited in the file of this patent

UNITED STATES PATENTS

| | | |
|---|---|---|
| 2,627,543 | Obermaier | Feb. 3, 1953 |
| 2,711,646 | Mendousse | June 28, 1955 |
| 2,724,269 | Kalmus | Nov. 22, 1955 |
| 2,739,478 | Offner | Mar. 27, 1956 |
| 2,779,931 | Hersey | Jan. 29, 1957 |
| 2,826,912 | Kritz | Mar. 18, 1958 |
| 2,874,568 | Petermann | Feb. 24, 1959 |
| 2,911,825 | Kritz | Nov. 10, 1959 |
| 2,911,826 | Kritz | Nov. 10, 1959 |
| 2,912,856 | Kritz | Nov. 17, 1959 |
| 2,923,155 | Welkowitz | Feb. 2, 1960 |
| 2,959,054 | Welkowitz | Nov. 8, 1960 |

FOREIGN PATENTS

| | | |
|---|---|---|
| 771,637 | Great Britain | Apr. 3, 1957 |
| 776,526 | Great Britain | June 5, 1957 |